Figure 1:
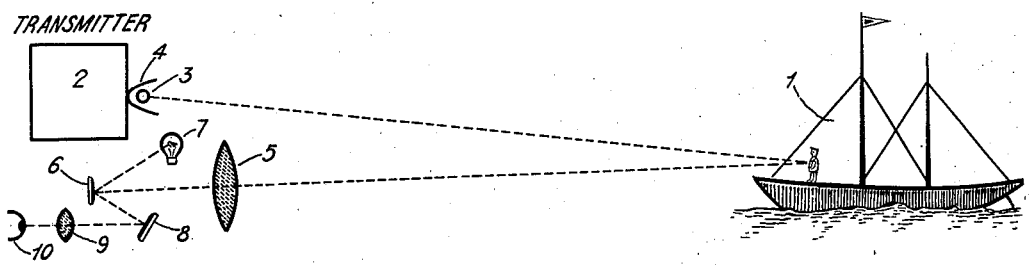

Dec. 7, 1937.  C. W. HANSELL  2,101,139
VISIBLE DETECTOR OF INVISIBLE RADIATION
Filed Dec. 31, 1934

INVENTOR.
C.W. HANSELL

BY

ATTORNEY.

Patented Dec. 7, 1937

2,101,139

UNITED STATES PATENT OFFICE 2,101,139

VISIBLE DETECTOR OF INVISIBLE RADIATION

Clarence Weston Hansell, Rocky Point, N. Y., assignor to Radio Corporation of America, a corporation of Delaware Application December 31, 1934, Serial No. 760,057

9 Claims. (Cl. 250—1)

This invention relates to a detector for invisible radiation. An object of this invention is to provide apparatus for and to devise a means whereby an observer may see a distant object through a dense fog or at night time.

Another object of this invention is to make visible radiations of a frequency normally lower than that of the normal frequency of visible light.

A feature of this invention is the novel ways and means of providing detection for invisible radiation.

In solving the problem of viewing an object hidden only by fog or darkness, and not screened by a solid substance, it is necessary to provide a suitable form of detector or method of detection in which the invisible object is picked up or observed by light beams suitably radiated. This can be accomplished by directly radiating light beams from the invisible object desired to be seen or by providing means for radiating from a position near the observer electromagnetic waves of a few millimeters length or even less. In the case of radiation from a transmitter which is located near the observer, we would expect a beam of radiation to be sent out after the manner of an automobile headlight. This radiation would be reflected by objects in its path just as in the case of the light from the automobile headlight and a part of the reflected radiation would be returned to the observer where, if it could be suitably detected, it could be made to form an image of the object.

One of the most obvious methods for detecting the radiation would be to project it on a screen or film of fluorescent material. However, this method is perhaps unsuitable because the amount of energy necessary to produce a lighted image by fluorescence is too great.

However, if the effect of the projected radiation could be made accumulative then the energy of the reflected radiation would be greatly increased.

By my invention I propose to make a detector for invisible radiation in which the effect would be accumulative and therefore overcome the above-mentioned objection by projecting the invisible radiation on a screen or film of more or less deliquescent material, the color of which is changed by hydration or dehydration. Many of the well-known metal salts could be used for this purpose. One of the most common materials I propose to use is copper sulphate which is normally blue, but when all water is extracted from it, it will appear as white. I find that cobalt chloride may also be used, which is a substance that appears red when hydrated and turns blue when dehydrated.

In the detector of my invention I provide a film of copper sulphate or cobalt chloride which might be mounted in a glass vessel suitably evacuated except for the presence of just about enough water vapor to turn, say, 50% to 75% of the metal salt blue. Since the hydration of the metal salt would be uniformly distributed over the film located within the glass vessel, the normal appearance of the screen would be that of a uniform light blue field.

If the very short wave radiation from the transmitter which is to be made visible is caused to impinge on the screen or film located in the glass chamber in such a manner so as to form an invisible image of the objects reflecting the radiation sent out, then the radiation will cause dehydration of the metal salt at points of maximum intensity and also cause an increase in hydration at points where no radiation strikes. Under proper working conditions, one may expect the degree of hydration to be roughly inversely proportional to the intensity of the radiation forming the image and the image will be made visible as a white object on a blue background.

To obtain the best results from my invention, it is necessary that the amount of water vapor in the vessel containing the screen or film of metal salt be properly adjusted or maintained with the right degree of evacuation. Also, the temperature of the vessel should be properly controlled.

The actual size of the screen and the image desired to be shown on it may be made as small as the wave length of the radiation from the transmitter will permit, so as to obtain a greater intensity of energy on the screen. A large lens should also be used for picking up a large amount of the radiation and focussing it. The image may be viewed through a magnifying lense to give it a suitable apparent size.

Figure 2:
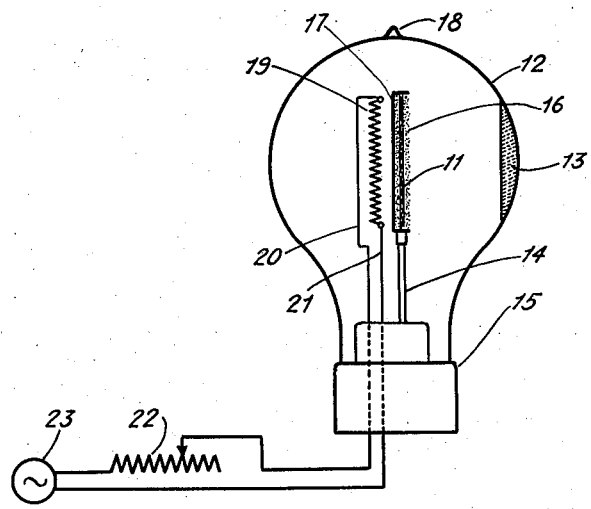

This invention will be best understood by referring to the accompanying drawing, in which, Fig. 1 is a diagram of the arrangement of the system for detecting invisible radiation, and Fig. 2 is a detailed showing of the detector having a film of metal salts located within a suitable vessel.

Referring now to Fig. 1, the object to be detected through fog or at night, without being aware of surveillance is indicated by 1. The transmitter for sending out radiation is indicated by 2. The type of waves to be sent out are electromagnetic waves long enough to be invisible and not too long to prevent casting of a sharply defined image on the lens. The transmitter 2 is provided by a radiator 3 and is surrounded by a suitable short wave reflector 4 which is employed to keep the radiated energy directed within a limited path. In order to focus the reflected energy there is provided a large lens 5 which is interposed between the object to be seen and the screen of the detector 6. A source of visible light 7 is provided for illuminating the screen 6 and a mirror 8 is arranged so as to direct the reflected radiation from the screen 6 to a magnifying lens 9, the eye of the observer being located in a position indicated by 10.

Referring now to Fig. 2, the detector is shown with the screen 11 located within a glass vessel 12, the front portion of which is accurately finished at a portion 13 for receiving undistorted beams of light. The screen is supported within the vessel 12 by an upright portion 14 which is securely fastened to the base element 15. The front surface of the screen 11 is coated with a film of copper sulphate or cobalt chloride 16 and is backed by any suitable non-absorbing material 17. The vessel is suitably evacuated at a point 18, except for the presence of just enough water vapor to maintain the metal salt in a sub-saturated condition, namely, 50% to 75%. Therefore, the atmosphere in the vessel will be normally dry. The change in the color of the metal salt is caused by moisture being driven off of one point and reabsorbed at another place. To control the percentage of the turning of the color or the amount of hydration of the metal salt, there is provided a heating element 19 which is electrically connected by means of leads 20 and 21 to a variable resistance 22 for controlling the heat within the vessel, the heat being supplied from any suitable electrical source indicated at 23.

Although this invention has been described as embodied in a particular arrangement, it should be understood it is capable of being embodied in a different arrangement within the spirit and scope of the invention, and therefore should not be limited except by those limitations clearly imposed in the appended claims.

What I claim is:

1. A detector for invisible radiation comprising a screen for receiving said invisible radiation, a metal salt including water of hydration located on the face thereof and means for mounting said screen within a partial evacuated glass vessel containing a sufficient amount of water vapor to maintain said metal salt in a subsaturated condition.

2. A detector for invisible radiation comprising a screen for receiving said invisible radiation, copper sulphate located on the face thereof and means for mounting said screen within a partial evacuated glass vessel containing water vapor of a quantity which is sufficient to turn from 50 to 75% of said copper sulphate blue and thereby maintaining said copper sulphate in a subsaturated condition.

3. A detector for invisible radiation comprising a screen for receiving said invisible radiation, a metal salt including water of hydration located on the face thereof, means for mounting said screen within a partial evacuated glass vessel containing a sufficient amount of water vapor to maintain said metal salt in a subsaturated condition, and heating means located adjacent said screen for controlling the temperature within said vessel.

4. A detector for invisible radiation comprising a screen for receiving said invisible radiation, a metal salt including water of hydration located on the face thereof, means for mounting said screen within a partial evacuated glass vessel containing a sufficient amount of water vapor to maintain said metal salt in a subsaturated condition and heating means located adjacent said screen, said heating means externally controlled by a variable resistance element to vary the temperature within said vessel.

5. A detector for invisible radiation comprising a screen for receiving said invisible radiation, a metal salt including water of hydration located on the face thereof and means for mounting said screen within a partial evacuated glass vessel a portion of which has means for receiving undistorted beams of light, said evacuated vessel containing a sufficient quantity of water vapor to maintain said metal salt in a subsaturated condition.

6. A detector for invisible radiation comprising a screen for receiving said invisible radiation, cobalt chloride located on the face thereof and means for mounting said screen within a partial evacuated vessel containing water vapor of a quantity which is sufficient to turn from fifty to seventy-five percent of said cobalt chloride blue and thereby maintaining said cobalt chloride in a sub-saturated condition.

7. A detector for invisible radiation comprising a screen for receiving said invisible radiation, a metal salt including water of hydration located on the face thereof and means for mounting said screen within a partial evacuated vessel containing a sufficient amount of water vapor to maintain said metal salt in a sub-saturated condition, and temperature control means for controlling the temperature within said vessel.

8. A detector for invisible radiation comprising a translating device for receiving said invisible radiation, a metal salt including water of hydration forming part of said translating device, means for mounting said translating device within a partially evacuated vessel containing a sufficient amount of water vapor to maintain said metal salt in a sub-saturated condition.

9. A detector for invisible radiation comprising a translating device for receiving said invisible radiation, a metal salt including water of hydration forming part of said translating device, means for mounting said translating device within a partially evacuated vessel containing a sufficient amount of water vapor to maintain said metal salt in a sub-saturated condition, and means located adjacent said translating device to vary the temperature within said vessel.

CLARENCE WESTON HANSELL.